United States Patent [19]

Kirschner

[11] Patent Number: 4,516,233

[45] Date of Patent: May 7, 1985

[54] DISC RECORD PLAYER HAVING PLAYER CONTROL APPARATUS

[75] Inventor: Thomas F. Kirschner, Indianapolis, Ind.

[73] Assignee: RCA Corporation, New York, N.Y.

[21] Appl. No.: 556,254

[22] Filed: Nov. 29, 1983

[51] Int. Cl.³ .................... G11B 17/04; G11B 25/04; G11B 5/82
[52] U.S. Cl. ........................................ 369/79; 369/77.2
[58] Field of Search ................... 369/77.2, 79, 292

[56] References Cited

U.S. PATENT DOCUMENTS 4,453,240 6/1984 Kirschner .......................... 369/77.2

Primary Examiner—Steven L. Stephan
Attorney, Agent, or Firm—Paul J. Rasmussen; W. H. Meise; Dilip A. Kulkarni

[57] ABSTRACT

When a caddy is inserted into the player to load a record therein, it displaces a switch actuating lever to a second position thereof to turn on the player. The switch actuating lever moves back to its first position upon retrieval of the record from the player as the carriage is driven toward its OFF position to switch off the player.

7 Claims, 10 Drawing Figures

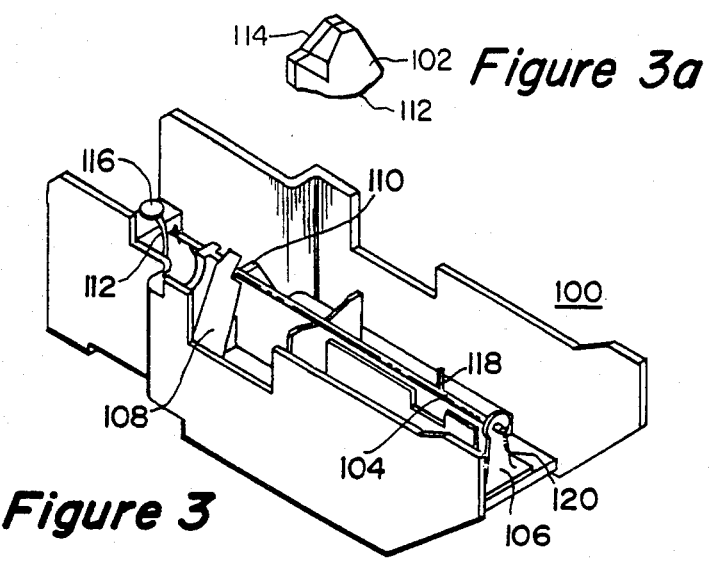
*Figure 3a*
*Figure 3*
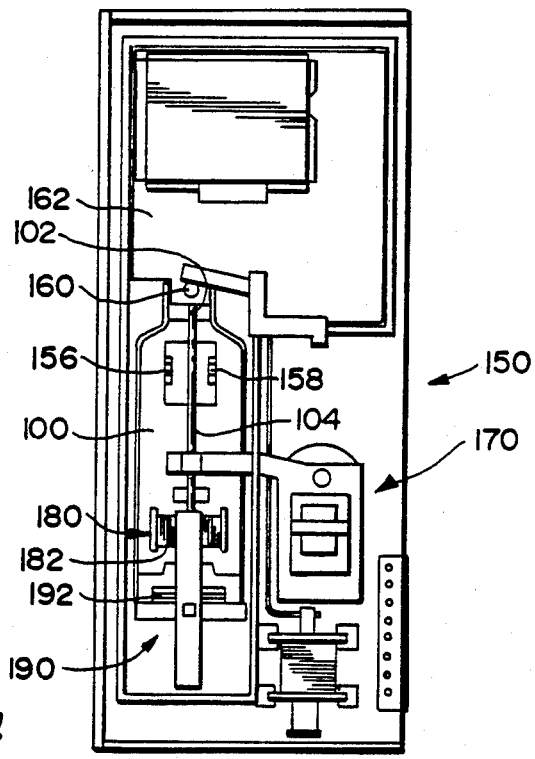
*Figure 4*

DISC RECORD PLAYER HAVING PLAYER CONTROL APPARATUS

This invention relates to a disc record player, and more particularly, it relates to a disc record player wherein a record is loaded into the player and removed therefrom while it remains encased in its protective caddy.

In certain video disc systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver.

In the video disc system, the groove density is typically quite high (e.g., groove width=2.5 micrometers approx.). The microscopic groove geometries require a pickup stylus that has rather fine dimensions (e.g., stylus tip width=2 micrometers). The pickup stylus is, therefore, housed in a protective cartridge, which is, in turn, inserted into a carriage housing. The carriage is translatably mounted in the player between an OFF position out of registry with, and an END-OF-PLAY position in registry with a turntable-supported record.

The video disc record is typically enclosed in a protective caddy which comprises an inner record retaining spine removably located within an outer jacket or sleeve. The record retaining spine and an associated record form a record/spine assembly. The record retaining spine is provided with a pair of locking fingers to releasably secure the spine to the sleeve.

For record loading, the carriage is arranged at its OFF position and a full caddy is inserted into an input slot provided in the player. When the caddy is inserted into the player, the carriage is driven to a STANDBY position adjacent to the OFF position thereof. A record extraction mechanism disposed in the player removes the record/spine assembly from the sleeve when the sleeve is withdrawn to leave the assembly inside the player resting on a set of record receiving pads. The retained record is lowered to the turntable for playback while the record retaining spine is held in place. The carriage is then quickly advanced to a START-OF-PLAY position in registry with the record, the stylus is brought into engagement with the turntable-mounted record, and the carriage is slowly translated to cause it to follow the radial motion of the groove-guided stylus. After playback, the stylus is separated from the record and the carriage is rapidly driven back to its STANDBY position. As the carriage is reset, the record is raised back up to redefine the record/spine assembly. For record retrieval, an empty sleeve is reinserted into the player to recapture the record/spine assembly. The caddy is then removed from the player. Upon activation of the off button, the carriage is driven to the OFF position and the player is turned off. U.S. Pat. No. 4,239,108 (Coleman et al.) and U.S. patent application Ser. No. 374,378 (Kirschner), respectively disclose a suitable caddy and a record extraction mechanism.

As previously indicated, the carriage has two separate off-record positions. The carriage is located at the OFF position when the player is not in use. The carriage is driven to the STANDBY position between successive record plays to allow the television to remain muted while changing discs.

In accordance with this invention, the player control apparatus includes a switch control lever movably mounted in the player housing between a first position and a second position. The lever is shifted to the second position in response to the insertion of a caddy into the player to turn on the player. The switch actuating lever, when arranged in the second position thereof, permits side-to-side motion of the carriage without interference. The switch actuating lever moves back to the first position in the absence of the record/spine assembly inside the player during the motion of the carriage to the OFF position. Upon arrival at the first position, the switch actuating lever turns off the player.

In the Drawings:

FIGS. 3 and 3a depict a pickup cartridge subject to installation in a translatably-mounted carriage of the FIG. 1 player;

FIG. 4 represents the carriage reciprocably mounted in the player of FIG. 1;

Figure 6:
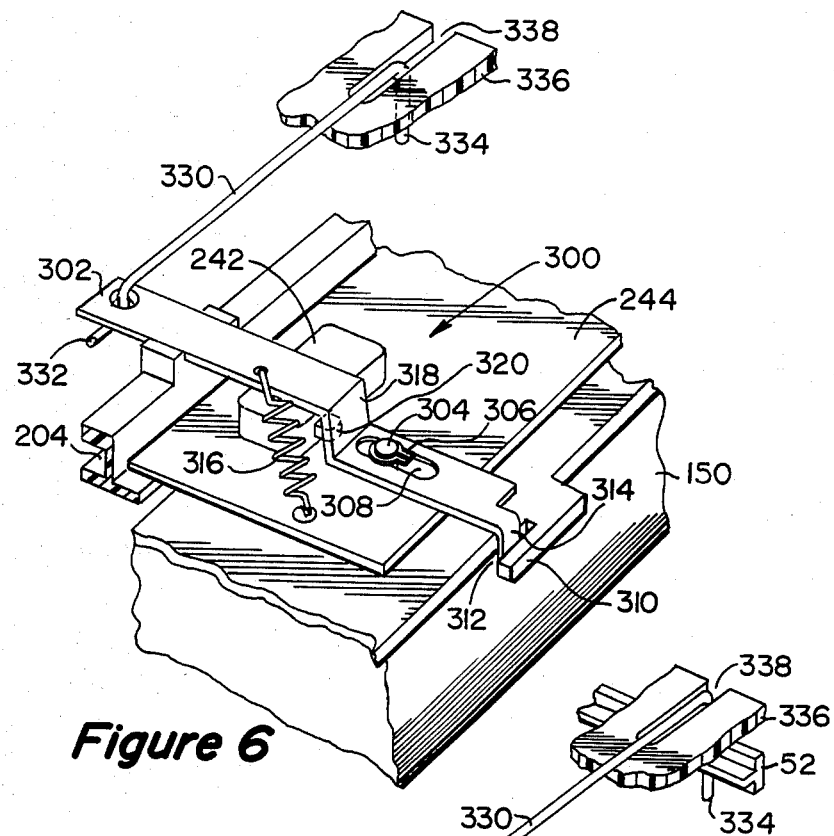
Figure 7:
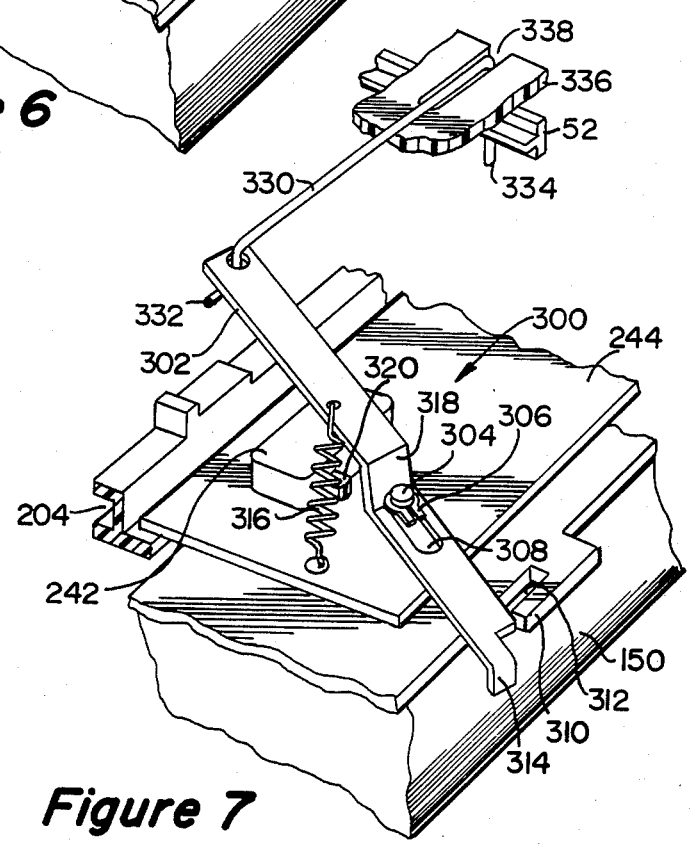
Figure 8:
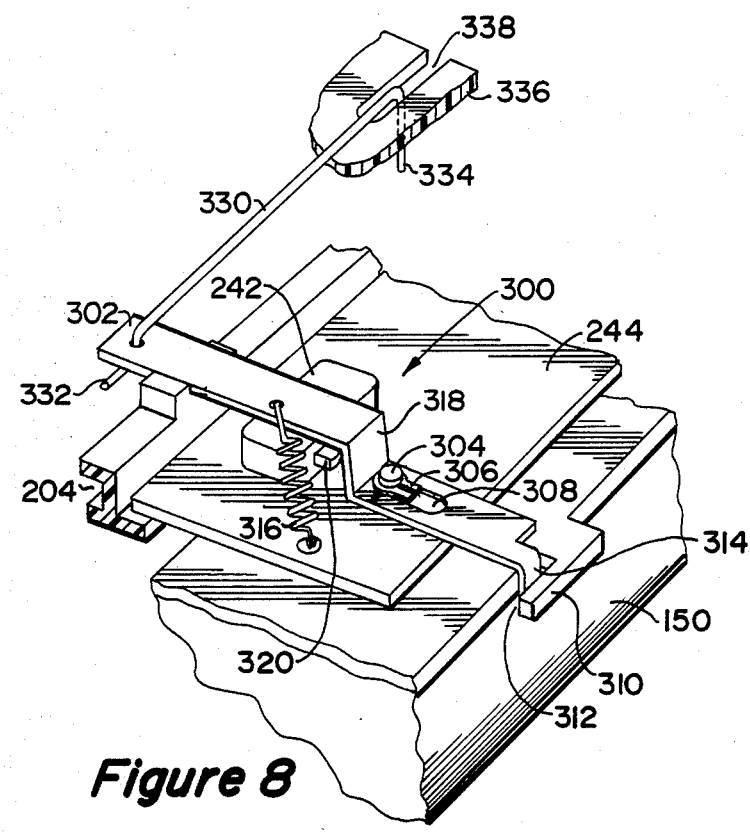

FIGS. 6–8 portray the operation of the subject player control mechanism.

Figure 1:
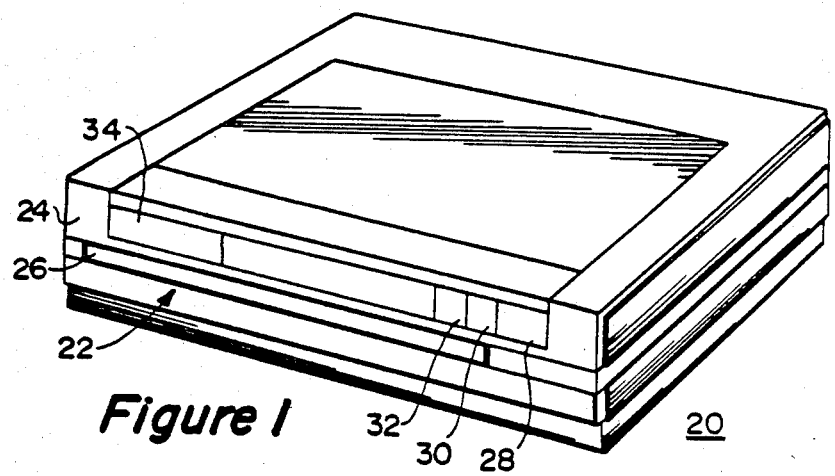
FIG. 1 shows a video disc player having a player control mechanism in accordance with this invention.
Figure 2A:
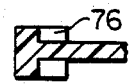
FIGS. 2 and 2a illustrate a video disc caddy suitable for use with the video disc player of FIG. 1.
Figure 2:
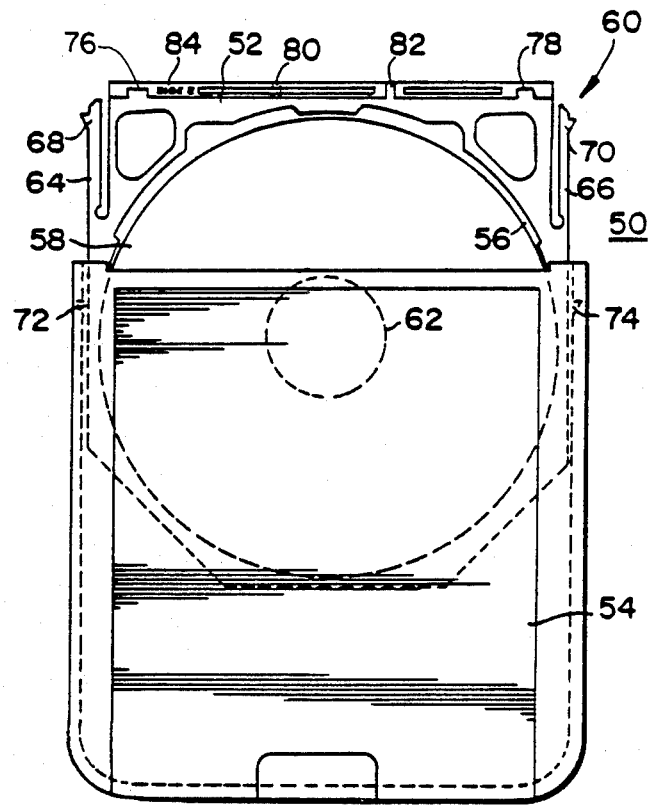

Shown in FIG. 1 is a video disc player 20. To play a disc, a video disc caddy 50, illustrated in FIG. 2, is inserted into an input slot 22 disposed in the front panel 24 of the player. The caddy input slot 22 is provided a pivotally-mounted door 26 to keep out the dust. The player has a record extraction mechanism 200, depicted in FIG. 5, which withdraws the record/spine assembly from the caddy sleeve and retains it within the player upon retraction of the sleeve. The record is automatically deposited on the turntable, and played back through a conventional television receiver. At any point during playback, the viewer can reject the remainder of the record by depressing the "OFF-/REJECT" button 28. If the user wishes to retrieve the record, an empty caddy is inserted into the player to recapture the record/spine assembly. The program can be interrupted anytime by activating the "PLAY/-PAUSE" button 30. The player is equipped with a RAPID ACCESS button 32 to provide rapid forward search (i.e., 240 times normal speed). An LED display 34 indicates elapsed time.

The FIG. 2 caddy 50 consists of a planar record retaining spine 52 removably enclosed in a flat outer sleeve 54. The retaining spine 52 has an opening 56 in which a centrally-apertured record 58 is received forming a record/spine assembly 60. Integrally molded with the spine 52 are spine locking fingers 64 and 66 for releasably capturing the spine in its sleeve 54. The spine locking fingers 64 and 66 are fitted with protruding elements 68 and 70 which are received in the respective recesses 72 and 74 provided in the sleeve 54 to hold the spine 52 in place. The spine 52 has cutouts 76 and 78 in which the respective spine latching members of the FIG. 5 record extraction mechanism 200 are selectively received to secure the spine to the player. The front edge of the spine 52 has slots 80 and 82 in which a side-to-side locating member of the player is received upon caddy insertion to accurately locate the record/- spine assembly 60 in the player. The spine 52 is further provided with record side identifying indicia 84.

As shown in FIG. 3, a pickup stylus 102 is mounted at one end of a stylus arm 104, the other end of which is suspended in a protective cartridge 100 by means of a suspension 106. A pair of retaining members 108 and 110 hold the stylus arm 104 within the cartridge during storage and handling. The retaining members 108 and 110 are defeated to release the stylus arm 104 upon installation of the cartridge in the player. A dual-purpose flylead 112 connects an electrode 114 disposed on the stylus 102 with a terminal 116 on the cartridge. The cartridge terminal 116 is coupled to the player electronics when the cartridge is mounted in the player. The flylead 112 also serves to provide the record/stylus tracking force during play.

Figure 5:
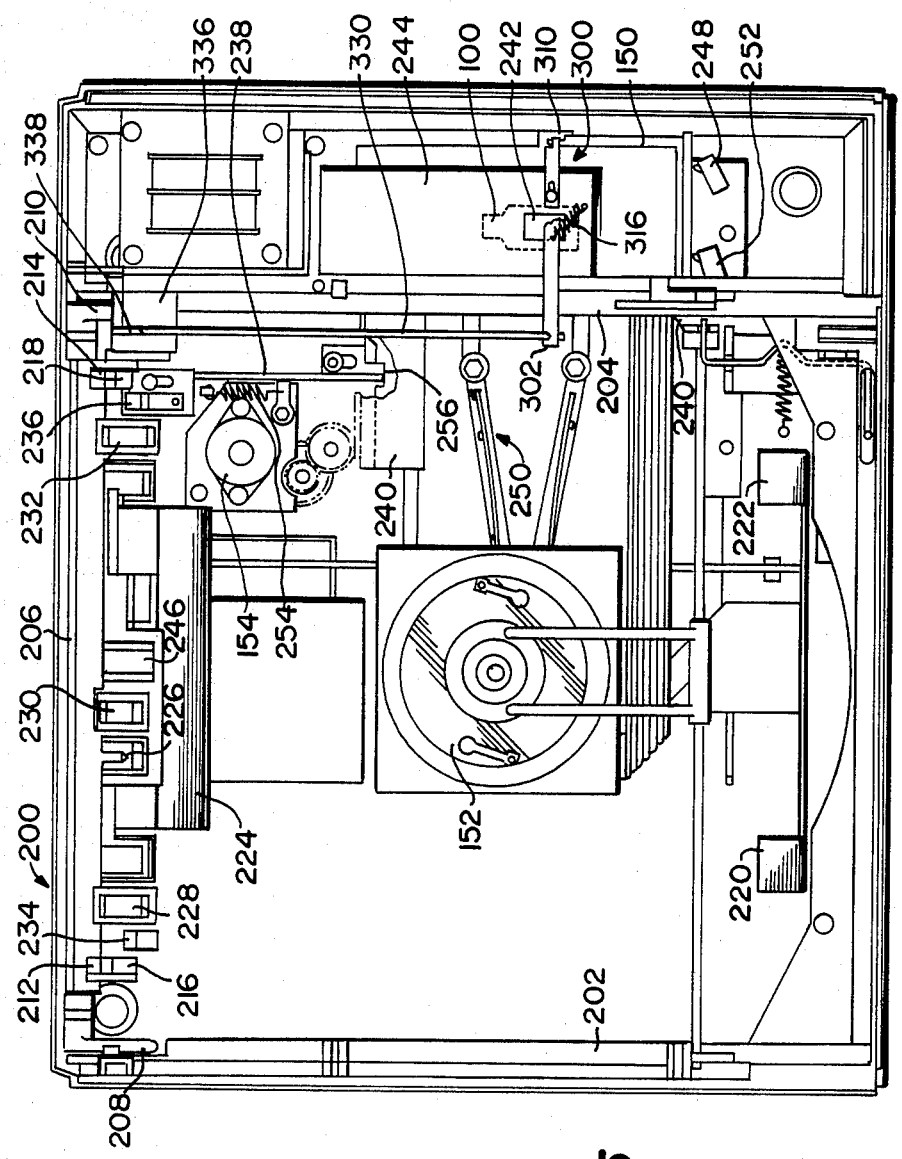
FIG. 5 is a plan view of the FIG. 1 video disc player.

The pickup cartridge is inserted in a carriage 150 in the manner shown in FIG. 4. The carriage 150 is translatably mounted in the player between an OFF position out of registry with, and an END-OF-PLAY position in registry with a record supported on a turntable 152 as indicated in FIG. 5. A motor 154 drives the carriage 150. Upon installation, a pair of tabs 156 and 158 pry open the retaining fingers 108 and 110 to free the stylus arm 104. The cartridge terminal 116 engages a terminal 160 of the pickuo circuits 162 located in the carriage 150 when the cartridge is located therein.

Disposed in the carriage 150 are a number of stylus control mechanisms. The stylus arm lifting/lowering mechanism 170 serves to separate the stylus from a turntable-mounted disc between playbacks, and then allows it to engage the disc for playback. (Refer to U.S. patent application, Ser. No. 449,314, of Brauer.) A groove skipper mechanism 180 comprises a permanent magnet 118 mounted on the stylus arm 104 at right angles to it, and an electromagnet 182 located in the carriage 150 near the skipper magnet. The groove skipper mechanism 180, when activated, serves to displace the stylus 102 laterally of the record, for example, in order to cause the stylus to skip ahead or back. (See U.S. Pat. No. 4,258,233 issued to Simshauser.) Further mounted in the carriage 150 is an armstretcher mechanism 190 including another permanent magnet 120 disposed axially inside the stylus arm 104, and an electromagnet 192 located in the carriage 150 adjacent to it. When signals are applied to the armstretcher electromagnet 192, it produces magnetic fields which interact with the stylus arm-mounted axial magnet 120 to cause front-to-back motion of the stylus arm 104 in a manner opposing the cyclical errors in the stylus/record relative velocity during playback. (Refer to U.S. patent application, Ser. No. 366,644, of Taylor et al.)

To load a record, the caddy 50 is manually inserted into the player through the input slot 22. The front edge of the caddy 50 pushes the spring-loaded retractable door 26 open to make way for the caddy. The player has a set of guide rails 202 and 204, depicted in FIG. 5, for guiding the caddy insertion along a path. The record extraction mechanism 200 serves to extract the enclosed record/spine assembly 60 from the caddy for retention in the player, and to return the retained assembly back to the caddy after playback without the need for touching the record. The record extraction mechanism 200 comprises a cross shaft 206 pivotally mounted near the back end of the player at right angles to the caddy insertion path. Disposed at the opposite ends of the offset shaft 206, and fixedly secured thereto, are a pair of spine releasing members 208 and 210. When the caddy 50 is inserted into the player, the wedge-like portions of the spine releasing members 208 and 210 protrude into the sleeve 54 to deflect the spine locking fingers 64 and 66, whereby the spine 52 is released from the sleeve.

The record extraction mechanism 200 further includes a pair of spine latching members 212 and 214 mounted freely on the cross shaft 206 adjacent to the respective spine releasing members 208 and 210. When the caddy 50 is inserted into the player, it rotates back the hook-like portions 216 and 218 of the spine latching members 212 and 214. A pair of coil springs (not shown) drive the hook-like portions 216 and 218 into the slots 76 and 78 in the spine 52 to lock the spine to the player. The sleeve 54 is then manually extracted, leaving the record/spine assembly 60 inside the player resting on a set of record receiving pads 220, 222 and 224. When the sleeve 54 is withdrawn, a pair of springs, connecting the spine releasing members 208 and 210 and the spine latching members 212 and 214 together, cause the spine releasing members to follow the spine latching members to their respective deflected interim positions.

A side-to-side locating member 226 is driven into the slot 80 disposed in the spine 52 as the caddy 50 arrives at its fully inserted position in the player to assure accurate lateral registration of the spine in the player. The player is further fitted with a pair of brackets 228, 230 and 232 which serve to ensure accurate vertical alignment of the spine 52. Disposed in the player are a pair of stiff leaf springs 234 and 236 which push the spine 52 out to provide accurate front-to-back alignment of the spine.

The leaf spring 236 is attached to a slidably-mounted member 238. As the caddy 50 is inserted into the player, its front edge drives back the leaf spring 236, to, in turn, push back the slidable member 238. The slidable member 238, when retracted, releases the carriage support bracket 240. The player has a caddy-operated switch actuating mechanism 300 in accordance with this invention. The actuating mechanism 300 turns on an AC switch 242 in response to the presence of the record/spine assembly 60 inside the player. The AC switch 242 is mounted on a bracket 244 attached to the caddy rail 204 in the manner indicated in FIGS. 6-8.

The player has a spine sense switch 246 at the innermost end thereof, which is activated when the caddy 50 is fully inserted into the player. The spine 52 holds the spine sense switch 246 in the on condition while it is within the player. Actuation of the AC switch 242 and the spine sense switch 246 causes the carriage 150 to move toward a STANDBY position near, and to the right of, the OFF position. Upon arrival at the STANDBY position, the carriage 150 actuates a standby switch 248 to arrest further motion thereof.

When the empty sleeve 54 is extracted from the player after record loading, the carriage 150 is driven toward the turntable 152. As the carriage 150 moves in, a disc handling mechanism 250 automatically lowers the receiving pads 220, 222 and 224 to transfer the retained record 58 to the turntable 152, while the spine 52 is held in place. The stylus lifting/lowering mechanism 170 permits the stylus 102 to engage the turntable-mounted record 58 when the carriage 150 arrives at the START-OF-PLAY position. A landing switch 252 senses the arrival of the carriage 150 at the START-OF-PLAY position.

During playback, the carriage motor 154 drives the carriage 110 to follow the pickup stylus 102. Upon playback, the carriage 150 is driven back out to the STANDBY position. As the carriage 150 is reset, the turntable-supported record is lifted back up by the receiving pads 220, 222 and 224 to redefine the record/spine assembly 60.

To recapture the record/spine assembly 60 after playback, the empty sleeve 54 is reinserted into the player. As the caddy sleeve 54 reaches the fully inserted position in the player, its front edge engages and further lifts up the spine releasing members 208 and 210. When the spine releasing members 208 and 210 are raised by the sleeve 54, they, in turn, press against the respective spine latching members 212 and 214 to push the hook-like portions out of the slots 76 and 78 in the spine 52 to release the spine. When the spine 52 is released, the stiff leaf springs 234 and 236 force the spine into the jacket 54 to snap it in place. The caddy is then manually removed from the player. The springs (not shown) rotate the spine latching members 212 and 214 and, in turn, the spine releasing members 208 and 210 downward until the spine releasing member 210 is against a stop (not shown) provided in the player housing, thereby resetting the caddy extraction mechanism 200 for the next cycle.

To switch off the player, the user activates the OFF/REJECT button 28. The carriage is then driven toward the OFF position. As it arrives at the OFF position, the subject AC switch actuating mechanism turns off the player. The player is also programmed to wait for a few minutes after retrieving the caddy and if no further action is taken in the interim, the carriage 150 is automatically sent to the OFF position, and the player is turned off when it arrives there. As the carriage 150 arrives at the OFF position, a coil spring 254 drives the sliding member 238 into a notch 256 provided in the carriage support bracket 240 to lock it in place.

The AC switch actuating mechanism 300, pursuant to this invention, will now be described in conjunction with FIGS. 6-8. As previously indicated, the actuating mechanism 300 turns on the player when a caddy is inserted into the player, and switches it off in the absence of a record/spine assembly inside the player during the motion of the carriage 150 toward the OFF position thereof.

The instant mechanism 300 includes a switch actuating lever 302 rotatably and slidably mounted on the supporting bracket 244 by means of a guide pin 304 and a retaining washer 306. The guide pin 304 is threaded through an elongated slot 308 in the switch actuating lever 302. FIG. 6 shows the switch actuating lever 302 in a first position thereof while the carriage 150 is occupying its OFF position. The carriage 150 is provided with an offset tab 310 which defines a slot 312 in which a bent portion 314 of the switch actuating lever 302 is selectively captured. The offset tab 310 of the carriage 150 holds the switch actuating lever 302 in the FIG. 6 position against the force of a coil spring 316. While in this position, a step portion 318 of the switch actuating lever 302 holds in a pin 320 of the AC switch 242 to turn off the player.

The subject mechanism 300 further comprises a spine sense member 330 having its one end 332 connected to the switch actuating lever 302. The spine sense member 330 is supported near its other end 334 on a bracket 336 attached to the caddy rail 204. The end 334 of the spine sense member 330 is bent and passed through a guide groove 338 in the support bracket 336. When the caddy is inserted into the player, the spine 52 engages and pushes back the bent end 334 of the spine sense member 330 as shown in FIG. 7. Retraction of the spine sense member 330 releases the tab portion 314 of the switch actuating lever 302 from the offset tab 310 of the carriage 150. As the switch actuating lever 302 clears the offset tab 310, the spring 316 displaces the lever to its second position depicted in FIG. 7 to free the pin 320 of the AC switch 242 to turn on the player. The carriage 150 is free to move back and forth without hindrance while the switch actuating lever 302 is occupying the second position thereof. The AC switch 242 is permitted to remain in the on condition as long as the spine 52 is within the player.

After play, the carriage 150 is driven back to the STANDBY position, and the record/spine assembly is retrieved from the player in the manner indicated in FIG. 8. As the caddy is withdrawn from the player, the coil spring 316 inserts the tab 314 of the switch actuating lever 302 into the slot 312 of the carriage 150 to thereby dispose the lever at the intermediate position thereof. When the OFF/REJECT button is activated, the carriage 150 is driven toward the OFF position shown in FIG. 6. During the motion of the carriage 150 toward the OFF position, the offset portion 310 of the carriage 150 displaces the switch actuating lever 302 toward its first position. As the switch actuating lever 302 arrives at the first position, the step portion 318 of the lever depresses the pin 320 of the AC switch 242 to turn off the player.

To recapitulate the operation of the subject switch actuating mechanism 300, the sequence of events is as follows.

Initially, the carriage 150 is at its OFF position. The switch actuating lever 302, while in the first position thereof, turns off the player.

A caddy is inserted to load a record into the player. The switch actuating lever 302 is displaced to its second position to turn on the player. The lever 302 is held in the second position by the spine 52 as long as it is inside the player.

After play, the carriage is driven back to the STANDBY position and the record/spine assembly is retrieved from the player. The switch actuating lever 302 moves to the intermediate position thereof. The player remains in the on condition to allow the television circuits to remain muted during record loading/unloading operations.

Upon activation of the OFF/REJECT button, the carriage 150 is driven to the OFF position. As this happens, the carriage 150 engages and drives back the switch actuating lever 302 to the first position to turn off the player, and the cycle repeats.

Several variations of the present switch actuating mechanism 300 are possible. For example, instead of biasing the switch actuating lever 302 away from its first position, it can be urged toward the first position to cause the lever to return to the first position under the spring force upon removal of the record/spine assembly from the player during the motion of the carriage 150 toward the OFF position. In which case, the switch actuating lever 302 can be displaced by the caddy to its second position during a caddy insertion, and held there by the spine 52 while it is inside the player against the force of the spring.

The subject design is both cost and performance effective.

What is claimed is:

1. In a player for recovering prerecorded information from a turntable-supported disc record by a signal pickup when pickup/record relative velocity is established; said signal pickup being housed in a carriage, which is translatably mounted in said player between an off position out of registry with, and an end-of-play position in registry with said turntable-supported record; said record being removably received in a protective caddy comprising a jacket and a record retaining spine; said spine and an associated record forming a record/spine assembly; said player being further equipped with a record extraction mechanism which withdraws said record/spine assembly from said jacket for retention inside said player upon jacket retraction subsequent to caddy insertion into said player; said carriage being driven toward said record for playback, and, after playback, driven to a standby position near said off position; an empty caddy being inserted into said player for retrieving said retained record/spine assembly; said carriage being driven to said off position upon retrieval of said record/spine assembly from said player; player control apparatus comprising:
(A) a switch subject to conditioning in an off state and an on state to, respectively, turn off and turn on power to said player;
(B) a switch actuating lever movably mounted in said player between a first position and a second position; said lever being displaced to said second position in response to the presence of said spine in said player to turn on said switch; said lever, when occupying said second position thereof, allowing to-and-fro motion of said carriage without hindrance; said lever moving back to said first position thereof in the absence of said spine in said player during the motion of said carriage to said off position to turn off said switch.

2. The player control apparatus as outlined in claim 1 wherein said switch actuating lever is subject to positioning in a further position intermediate of said first and second positions; said lever occupying said intermediate position in the absence of said spine in said player while said carriage is not occupying said off position thereof.

3. The player control apparatus as described in claim 2 wherein said switch continues to remain in said on state when said switch actuating lever is occupying said intermediate position thereof.

4. The player control apparatus as set forth in claim 3 further including a spine sensing member coupled to said switch actuating lever and subject to engagement with said caddy for movement from an advanced position to a retracted position in response to an insertion of a caddy into said player to, in turn, move said switch actuating lever to said second position.

5. The player control apparatus as defined in claim 4 further including means for biasing said switch actuating lever away from said first position thereof.

6. The player control apparatus of claim 5 wherein said carriage engages said switch actuating lever disposed in said intermediate position to displace said lever to said first position thereof as said carriage moves from said standby position to said off position to turn off power to said player.

7. The player control apparatus outlined in claim 5 wherein said biasing means further serves to locate said spine sensing means at said advanced position in the absence of said spine in said player.

* * * * *